May 3, 1966   R. B. HUDSON   3,249,116
APPARATUS FOR PROPORTIONING A MATERIAL
Filed May 6, 1964   3 Sheets-Sheet 1

INVENTOR
ROBERT B. HUDSON
BY Richard H. Childress
ATTORNEY

May 3, 1966  R. B. HUDSON  3,249,116
APPARATUS FOR PROPORTIONING A MATERIAL
Filed May 6, 1964  3 Sheets-Sheet 2
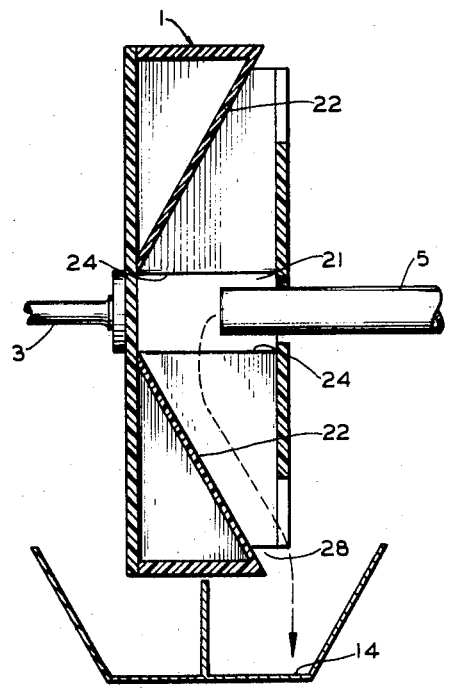
FIG. 3
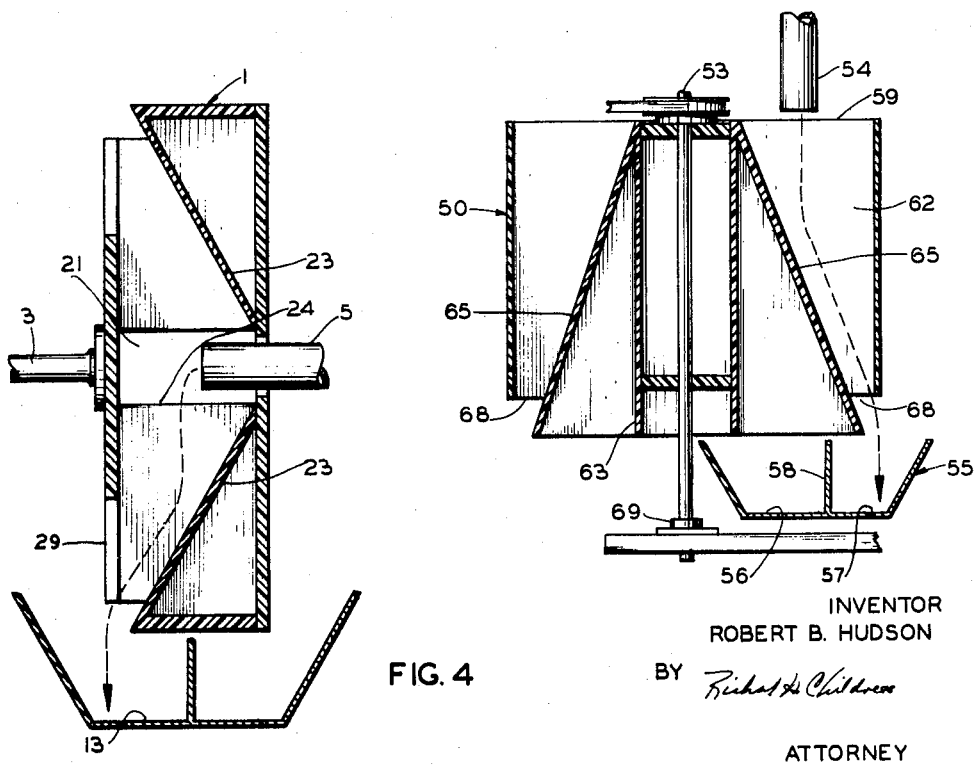
FIG. 4
FIG. 8
INVENTOR
ROBERT B. HUDSON
BY *Richard H. Childress*
ATTORNEY May 3, 1966 R. B. HUDSON 3,249,116
APPARATUS FOR PROPORTIONING A MATERIAL
Filed May 6, 1964 3 Sheets-Sheet 3
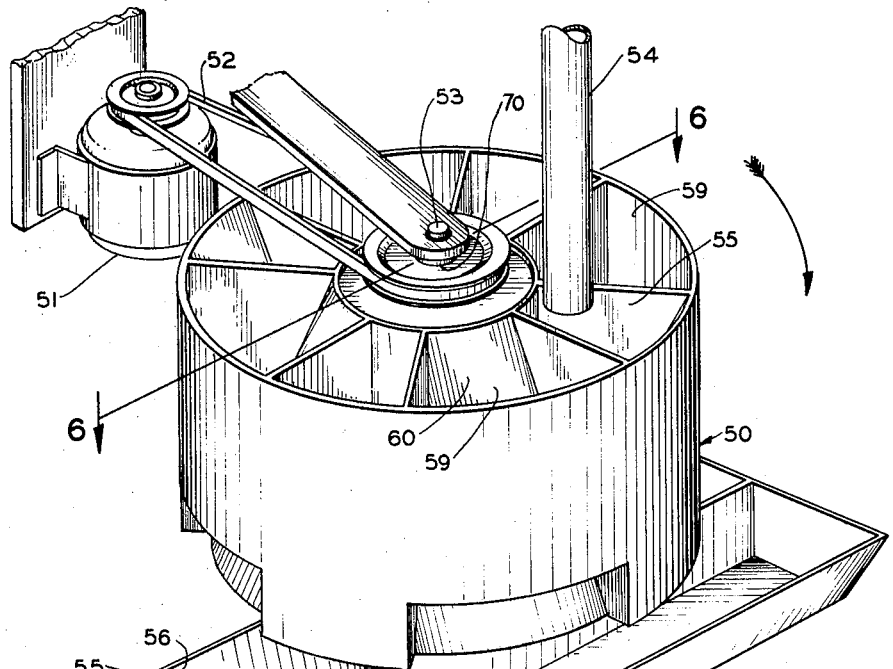
FIG. 5
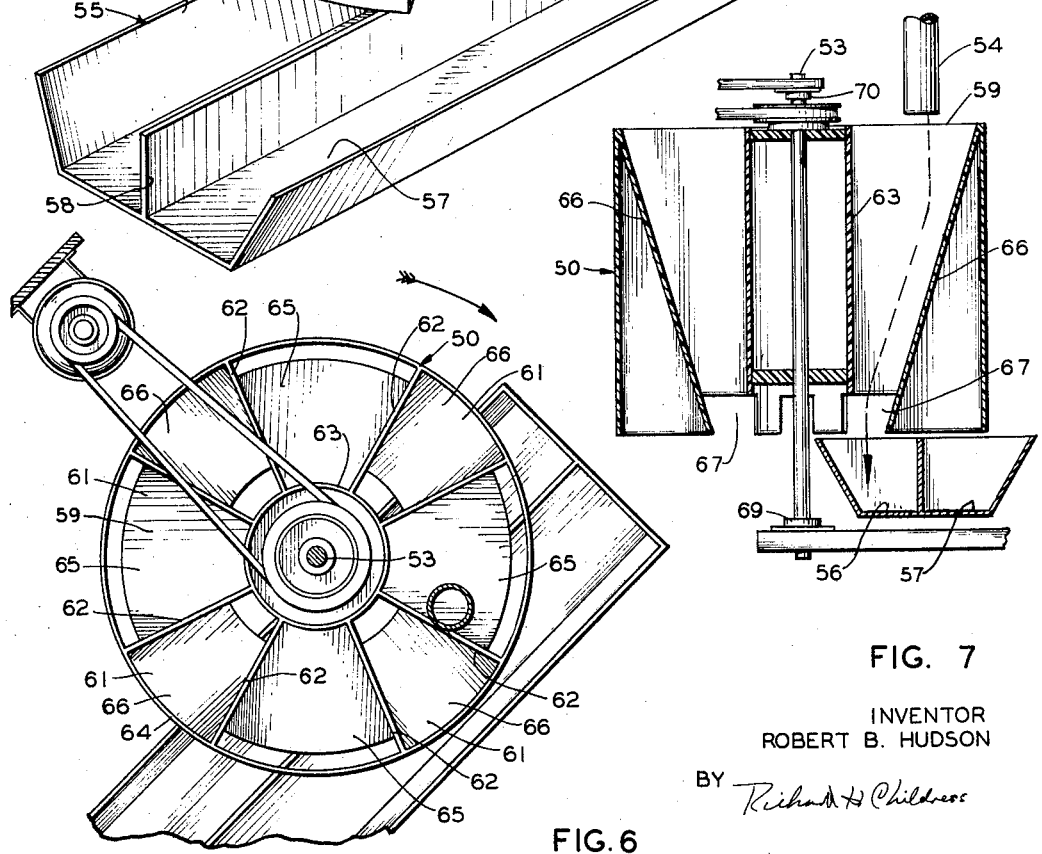
FIG. 6
FIG. 7
INVENTOR
ROBERT B. HUDSON
BY Richard H. Childress
ATTORNEY

United States Patent Office 3,249,116
Patented May 3, 1966

3,249,116
APPARATUS FOR PROPORTIONING A MATERIAL
Robert B. Hudson, St. Louis, Mo., assignor to Monsanto Company, St. Louis, Mo., a corporation of Delaware
Filed May 6, 1964, Ser. No. 365,365
5 Claims. (Cl. 137—262)

The present invention relates to an apparatus for proportioning a material. More particularly, the present invention relates to an apparatus for sub-dividing a stream of material into a plurality of proportions.

In the chemical industry there is need at times in carrying out certain chemical processes to divide or separate a stream of material into highly accurate weight or volume ratios in order to react the various portions of the stream at different steps and/or under different conditions. The apparatus for carrying out the process should preferably be not only accurate but also capable of continuous operation, easily adaptable for use in splitting streams of material into various weight or volume ratios and the apparatus should preferably exhibit simplicity of operation for ease of cleaning and maintenance.

It is therefore an object of this invention to provide an apparatus for sub-dividing a material into a plurality of proportions in a highly accurate manner.

It is another object of this invention to provide an apparatus for sub-dividing a stream of material into a plurality of proportions in a highly accurate and continuous manner.

It is a still further object of this invention to provide an apparatus which is easily adaptable for use in splitting a stream of material into various weight or volume ratios in a highly accurate and continuous manner.

It is a further object of this invention to provide an apparatus having a simplicity of operation and which is easily adaptable for use in splitting a stream of material into various weight or volume ratios in a highly accurate and continuous manner.

These objects will become more apparent from a reading of the following detailed description.

This invention, in general, pertains to an apparatus for sub-dividing or separating a stream of material into a plurality of proportions by establishing the stream of material initially in gravity flow, passing the stream of material through a plurality of apertures moving across the stream in order to sequentially interrupt and subdivide the stream and directing the streams of subdivided material in a plurality of directions away from the initial flow in order to maintain the streams of subdivided material in a separated state.

In general, the material for use in the apparatus of the present invention can be either in the particulate solid, liquid or solid-liquid slurry state.

In order to facilitate the description and understanding of this invention, reference is made to the appended drawings in which:

FIGURE 3 is a fragmentary elevation view showing the path of the material through the apparatus of FIGURE 1 in one position during the operation thereof;

FIGURE 4 is a fragmentary elevation view showing the path of the material through the apparatus of FIGURE 1 in another position during the operation thereof;

FIGURE 5 is a perspective view of another embodiment of this invention;

FIGURE 6 is a sectional plan view of the apparatus viewed through the plane containing line 6—6 of FIGURE 5;

FIGURE 7 is a fragmentary elevation view showing the path of the material through the apparatus of FIGURE 5 in one position during the operation thereof; and FIGURE 8 is a fragmentary elevation view showing the path of the material through the apparatus of FIGURE 5 in another position during the operation thereof.

Figure 1:
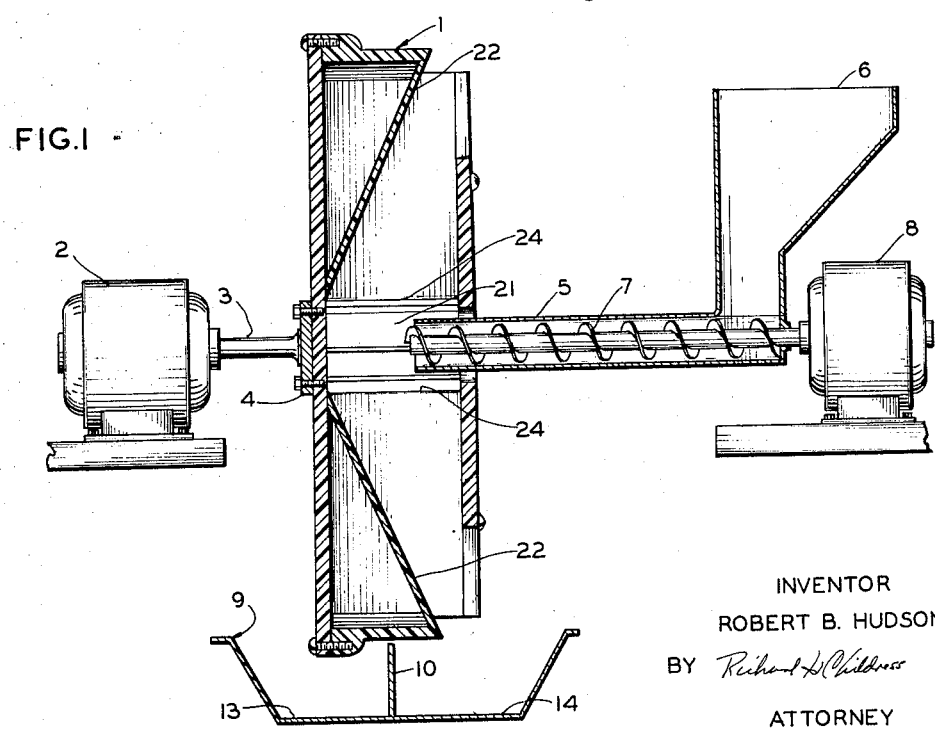
FIGURE 1 is a sectional elevation view of an apparatus embodying the concepts of this invention.

Referring now to FIGURE 1, an apparatus for subdividing a stream of material into a plurality of proportions and embodying the concepts of this invention is shown. The apparatus is comprised of a rotatable drum 1 capable of being rotated about an axis of rotation in a substantially vertical plane by means of a motor 2 connected thereto through a rotatable drive shaft 3 which is secured to the drum by a flange means 4. This, therefore, permits the motor to rotate the drum in a substantially vertical position by direct linkage. The drum 1 has an entrance zone 21 for feeding a stream of material thereto by means of a feed line 5 equipped with a hopper 6 for ease in handling and feeding the stream of material to the feed line 5 and a suitable conveying means, such as a screw conveyor 7 driven by motor 8, for feeding the stream of material to the drum 1. A suitable collecting arrangement 9 is positioned beneath the drum 1 in order to collect and/or pass the stream of sub-divided material exiting from the drum 1 for further processing and/or handling. The collecting arrangement 9 can take the form of pans or bins, 13 and 14, for collecting the material and is provided with a center section 10 in order to keep the proportioned material segregated, as shown, or separate chute arrangements for passing the proportioned material for further collecting or processing steps. The drum 1 is provided with apertures, such as shown at 24, through which the stream of material passes, and baffles, such as shown at 22, which are adapted to cooperate with the apertures and direct the passed stream of material into the collecting arrangement 9.

Figure 2:
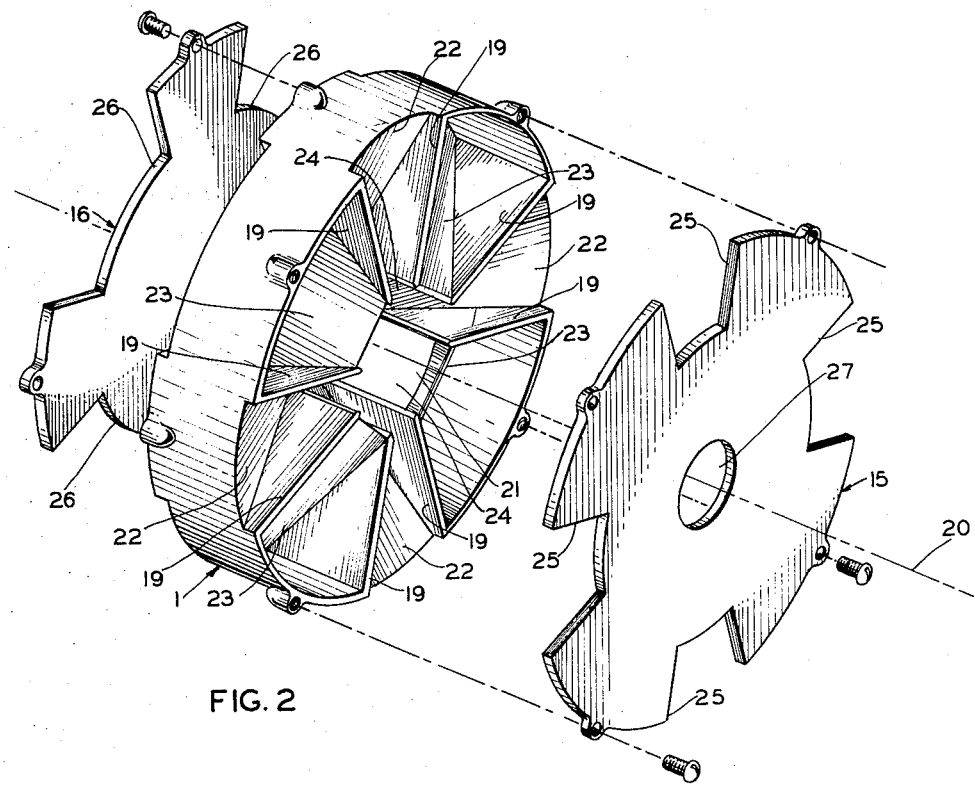
FIGURE 2 is an exploded perspective view of the drum illustrated in FIGURE 1.

In FIGURE 2 the drum of FIGURE 1 is further illustrated with the front cover 15 and back cover 16 removed therefrom. The drum is partitioned into adjacently disposed radial sections by radially projecting ribs 19. The radial sections surround the axis of rotation 20 and are radially spaced therefrom in order to form an entrance zone 21 for receiving the stream of material into the drum. The radial sections are further partitioned by baffles, 22 and 23, with each baffle being substantially diagonally disposed within each radial section, and which are adapted to form with the ribs 19 and the front and back covers 15 and 16 apertures 24 through which the stream of material can pass. The baffles in adjacently disposed radial sections, i.e., 22 and 23, are positioned with respect to one another to direct the stream of material in different directions which are, in general, toward the oppositely-opposed covers, i.e., the front cover 15 and the back cover 16. As can be appreciated, the relative size relationships of the apertures determine to a considerable extent the desired weight or volume ratio which the stream is to be sub-divided into and the apertures can be varied in size with respect to one another by merely varying the number and/or size of the arc of the radial section. The front cover 15 and the back cover 16 are adapted to cooperate with the radial sections to form passages through which the streams of subdivided material can exit from the drum. As shown, a plurality of kerf sections 25 are spaced around the periphery of the front cover 15 and with the cover affixed to the drum the kerf sections 25 cooperate with the radial sections partitioned by baffles 22 to form passages through which the stream can exit from the drum. In like manner, a plurality of kerf sections 26 are spaced around the periphery of the back cover 16 and with the cover affixed to the drum cooperate with the radial sections partitioned by baffles 23 to form other passages through which the stream can exit from the drum. In addition, an aperture 27 positioned at the center of the front cover 15 permits the passage of the stream of material through the feed line and into the drum.

In FIGURES 3 and 4, the path which the stream of material takes through the apparatus when in operation at different periods of time is illustrated. Referring now to FIGURE 3, the drum 1 while being rotated by the drive shaft 3 is for a period of time in the position as shown. The stream of material enters the drum 1 through the feed line 5 into the entrance zone 21 of the drum. In the entrance zone 21 of the drum the stream of material establishes gravity flow, is interrupted by and passed through the aperture 24 when this aperture is in the position as shown during rotation, directed by the baffle 22 which cooperates with aperture 24 and exited from the drum through the passage 28 into the collecting arrangement 14. Referring now to FIGURE 4, in like manner the next position for the drum 1 while being rotated by the drive shaft 3 is illustrated. The stream of material enters the drum 1 through the feed line 5 into the entrance zone 21 of the drum. In the entrance zone 21 of the drum the stream of material establishes gravity flow, is interrupted by and passed through the aperture 24 when this aperture is in the position as shown during rotation, directed by the baffle 23 which cooperates with aperture 24 and exited from the drum through the passage 29 into the collecting arrangement 13. From the foregoing, it can therefore be appreciated that as the drum rotates while the stream of material is fed thereto, the stream of material establishes gravity flow within the drum, is sequentially interrupted by the rotating apertures and passed therethrough in a sub-divided state during a selected arc of rotation, and directed by the baffles into separated collecting arrangements.

It is a decided advantage of the apparatus and method of the present invention to accurately sub-divide the stream of material under conditions of varying flow rates of the material and varying rates of rotation of the apparatus without being affected to any appreciable degree from variations in the density, size of the particles and the like, of the stream of material. As can be appreciated, however, the rate of rotation of the apparatus, the period of rotation and the flow rate of the stream of material should be controlled to the extent that the rate of operation of the apparatus is preferably at a rate which permits within a period of time a sufficient number of portions of subdivided material which results in damping or diminishing any effects from variations in the material, flow rates and rates of rotation and thus accurately subdivides the material. It can further be appreciated that if the flow rate varies periodically the rate of rotation must not be, therefore, at a rate which will synchronize with the periodic flow rate. Within these restrictions, however, a great deal of variations can be permitted without any appreciable effect on the accuracy of sub-division.

In FIGURE 5 another embodiment of this invention is illustrated. The apparatus is comprised of a rotatable drum 50 capable of being rotated about an axis of rotation in a substantially horizontal plane and, as shown, in a clockwise direction by means of a motor 51 connected thereto through a belt arrangement 52 which drives a rotatable drive shaft 53 secured to the drum 50 and journaled in stationary bearings positioned above and beneath the drum (as shown by stationary bearing 70). The drive shaft 53 is centered on and rotatable about a vertical axis of rotation. This, therefore, permits the motor to rotate the drum in a substantially horizontal position through the belt arrangement. A feed line 54 is provided above the drum 50 for feeding the stream of material to the drum in vertical gravity flow. A suitable collecting arrangement 55 is positioned beneath the drum in order to collect and/or pass the stream of subdivided material exiting from the drum for further processing and/or handling. The collecting arrangement 55, as shown, takes the form of pans or bins, 56 and 57, for collecting the material and is provided with a center section 58 in order to keep the proportioned material segregated. The drum 50 is provided with apertures, as shown by 59, through which the stream of material passes and baffles, such as shown by 60, which are adapted to cooperate with the apertures 59 and direct the passed stream of material into the collecting arrangement 55.

In FIGURE 6 the apparatus of FIGURE 5 is further illustrated. The drum 50 is partitioned into adjacently disposed radial sections 61 by radially projecting ribs 62. The radial sections 61 surround the drive shaft 53 and are radially spaced therefrom in order to form a compartmentalized cylindrical structure bounded by an inner cylindrical wall 63 and an outer cylindrical wall 64. The radial sections 61 are further partitioned by baffles 65 and 66, with each baffle being substantially diagonally disposed within each radial section, and which are adapted to form with the ribs 62 and the inner and outer cylindrical walls, 63 and 64, respectively, apertures 59 through which the stream of material can pass. The baffles in adjacently disposed radial sections i.e., 65 and 66, are positioned with respect to one another to direct the stream of material in different directions which are, in general, toward the oppositely-opposed cylindrical walls, i.e., the inner and outer cylindrical walls, 63 and 64, respectively. Again it can be appreciated, that the apertures 59 can be varied in size with respect to one another by merely varying the number and/or size of the arc of the radial sections.

In FIGURES 7 and 8, the path which the stream of material takes through the apparatus when in operation at different periods of time is illustrated. Referring now to FIGURE 7, the drum 50 while being rotated by the drive shaft 53 is for a period of time in the position as shown. The stream of material is fed to the drum by the feed line 54 and established in vertical gravity flow before entering the drum. The stream of material as it enters the drum is interrupted by and passed through the aperture 59 when this aperture is in the position as shown during rotation, directed by the baffle 66 which cooperates with aperture 59 and exited from the drum through the passage 67 and into the collecting arrangement 56. Referring now to FIGURE 8, in like manner the next position for the drum 50 while being rotated by the drive shaft 53 is illustrated. The stream of material is fed to the drum 50 by the feed line 54 and established in vertical gravity flow before entering the drum. The stream of material as it enters the drum is interrupted by and passed through the aperture 59 when this aperture is in the position as shown during rotation, directed by the baffle 65 which cooperates with aperture 59 and exited from the drum through the passage 68 and into the collecting arrangement 57. From the foregoing, it can therefore be appreciated that as the drum rotates while the stream of material is fed thereto, the stream of material establishes gravity flow, is sequentially interrupted by the rotating apertures, passed therethrough in a subdivided state during a selected arc of rotation and directed by the baffles into separated collecting arrangements. FIGURES 7 and 8 further illustrate the drive shaft 53, which is secured to the inner cylindrical wall 63 of the drum 50 and journaled in the stationary bearing 69 beneath the drum and stationary bearing 70 above the drum and is thereby maintained in a fixed vertical rotatable position.

A vibratory feeder was used to feed dense soda ash into the entrance zone of an apparatus of the present invention with an angular set ratio of 1.80:1 and which was driven by an electric motor through a speed reducer. The soda ash was split into 2 streams and collected in drums which were weighed on a Ohaus balance to determine the split ratio. The apparatus speed was varied as indicated as well as the feed rate as indicated during runs of between about three minutes and five minutes duration with the following results.

Table I

| No. of Runs | Splitter Speed, r.p.m. | Feed Rate, g./sec. | Stream No. 1 Mean Percent | Stream No. 2 Mean Percent | Standard Deviation of Wt. Percentages | Mean Ratio | Standard Deviation of Split Ratio |
|---|---|---|---|---|---|---|---|
| 15 | 26 | 23 | 64.36 | 35.64 | 0.03 | 1.80546 | 0.00246 |
| 5 | 17 | 23 | 64.31 | 35.69 | 0.02 | 1.80176 | 0.00129 |
| 5 | 20 | 23 | 64.29 | 35.71 | 0.03 | 1.80053 | 0.00218 |
| 5 | 22.5 | 23 | 64.30 | 35.70 | 0.02 | 1.80077 | 0.00141 |
| 5 | 22.5 | 10 | 64.34 | 35.66 | 0.02 | 1.80431 | 0.00177 |

As can be observed from the above table, the accuracy of the apparatus is exceptional in that the average mean ratio of the above runs at varying speeds and feed rate is 1.80257 which corresponds quite well with the angular set ratio of 1.80 and the low standard deviation of split ratio indicates that the ratio had a negligible variation from run to run regardless of apparatus speed and feed rate.

What is claimed is:

1. Apparatus for accurately subdividing a stream of material into a plurality of proportions comprising in combination rotatable means containing means forming a plurality of separate apertures for sequentially interrupting and subdividing a stream of material by passing said material therethrough during selected portions of each rotation and a plurality of baffles cooperating with said apertures for directing said subdivided material to a plurality of collecting means during said selected portions of each rotation, means for rotating said rotatable means through said stream, and means for supplying said stream of material in vertical gravity flow to said rotatable means.

2. Apparatus for accurately subdividing a stream of material into two proportions comprising in combination rotatable means containing means forming a series of apertures for sequentially interrupting and subdividing a stream of material by passing said material therethrough during selected portions of each rotation and a series of baffles cooperating with said apertures for directing said subdivided material to two collecting means during said selected portions of each rotation, means for moving said rotatable means through said stream, and means for supplying said stream of material in vertical gravity flow to said rotatable means.

3. Apparatus for accurately subdividing a stream of material into two proportions comprising in combination rotatable means containing means forming a series of apertures of alternating predetermined size relationships for sequentially interrupting and subdividing a stream of material by passing said material therethrough during selected portions of each rotation and a series of baffles cooperating with said apertures for directing said subdivided material to two collecting means during said selected portions of each rotation, means for rotating said rotatable means through said stream, and means for supplying said stream of material in vertical gravity flow to said rotatable means.

4. Apparatus for accurately subdividing a stream of material into two proportions comprising in combination a drum having rotatable driving means connected thereto and rotatable about an axis of rotation, a plurality of radially projecting ribs within said drum and partitioning said drum to form a plurality of adjacently disposed apertures of alternating predetermined size relationships for sequentially interrupting and subdividing a stream of material by passing said material therethrough during selected portions of each rotation, said apertures surrounding said axis of rotation and radially spaced therefrom, a plurality of baffles cooperating with said apertures and said ribs to direct the flow of said subdivided material through said drum, said baffles cooperating with said adjacently disposed apertures by directing said subdivided material to separate collecting means during said selected portions of each rotation, and means for supplying said stream of material in vertical gravity flow to said drum at said selected portions of each rotation.

5. Apparatus for accurately subdividing a stream of material into two proportions comprising in combination a drum having rotatable driving means connected thereto and rotatable about a horizontal axis of rotation, a plurality of radially projecting ribs within said drum and partitioning said drum to form a plurality of adjacently disposed apertures of alternating predetermined size relationships for sequentially interrupting and subdividing a stream of material by passing said material therethrough during selected portions of each rotation, said apertures surrounding said axis of rotation and radially spaced therefrom, a plurality of baffles cooperating with said apertures and said ribs to direct the flow of said subdivided material through said drum, said baffles cooperating with said adjacently disposed apertures by directing said subdivided material to separate collecting means during said selected portions of each rotation, and means for supplying said stream of material in vertical gravity flow to said drum at said selected portions of each rotation.

References Cited by the Examiner

UNITED STATES PATENTS

| 457,145 | 8/1891 | Bridgman | 73—424 |
| 2,753,099 | 7/1956 | Jenner et al. | 141—131 X |

MARTIN P. SCHWADRON, *Acting Primary Examiner.*